United States Patent

[11] 3,602,222

| [72] | Inventor | Richard A. Herndon |
| | | Englewood, Colo. |
| [21] | Appl. No. | 759,961 |
| [22] | Filed | Sept. 16, 1968 |
| [45] | Patented | Aug. 31, 1971 |
| [73] | Assignee | Honeywell Inc. |
| | | Minneapolis, Minn. |

[54] RATE METER, PARTICULARLY A BEAT-BY-BEAT CARDIOTACHOMETER
7 Claims, 8 Drawing Figs.

[52] U.S. Cl. .................................................. 128/2.06 F, 324/78
[51] Int. Cl. .................................................. A61b 5/04
[50] Field of Search ............................................ 128/2.05 P, 2.05 T, 2.06; 324/78 E; 307/279

[56] References Cited
UNITED STATES PATENTS

| 3,518,983 | 7/1970 | Jorgensen................ | 128/2.06 A |
| 2,540,505 | 2/1951 | Bliss....................... | 324/78 E |
| 3,174,478 | 3/1965 | Kahn....................... | 128/2.06 |
| 3,228,391 | 1/1966 | Fitter et al................ | 128/2.05 T |
| 3,438,368 | 4/1969 | Karsh...................... | 128/2.06 |

FOREIGN PATENTS

| 1,248,225 | 8/1967 | Germany.................. | 128/2.05 T |

Primary Examiner—William E. Kamm
Attorney—Arthur H. Swanson

ABSTRACT: A ratemeter, particularly a cardiotachometer is provided having means for detecting, amplifying and transmitting only the R-waves of a patient's ECG. A pulse generator including a level detector is responsive to the R-waves to generate beat pulses. Signal generator means are responsive to the beat pulses to produce control signals to alternately operate first and second integrators. The integrators generate output pulses proportional to the beat-by-beat heart beat rates which pulses are then displayed on first indicator means. Second indicator means are included to detect and indicate cardiac arrhythmia.

INVENTOR.
RICHARD A. HERNDON

INVENTOR.
RICHARD A. HERNDON

*INVENTOR.*
RICHARD A. HERNDON

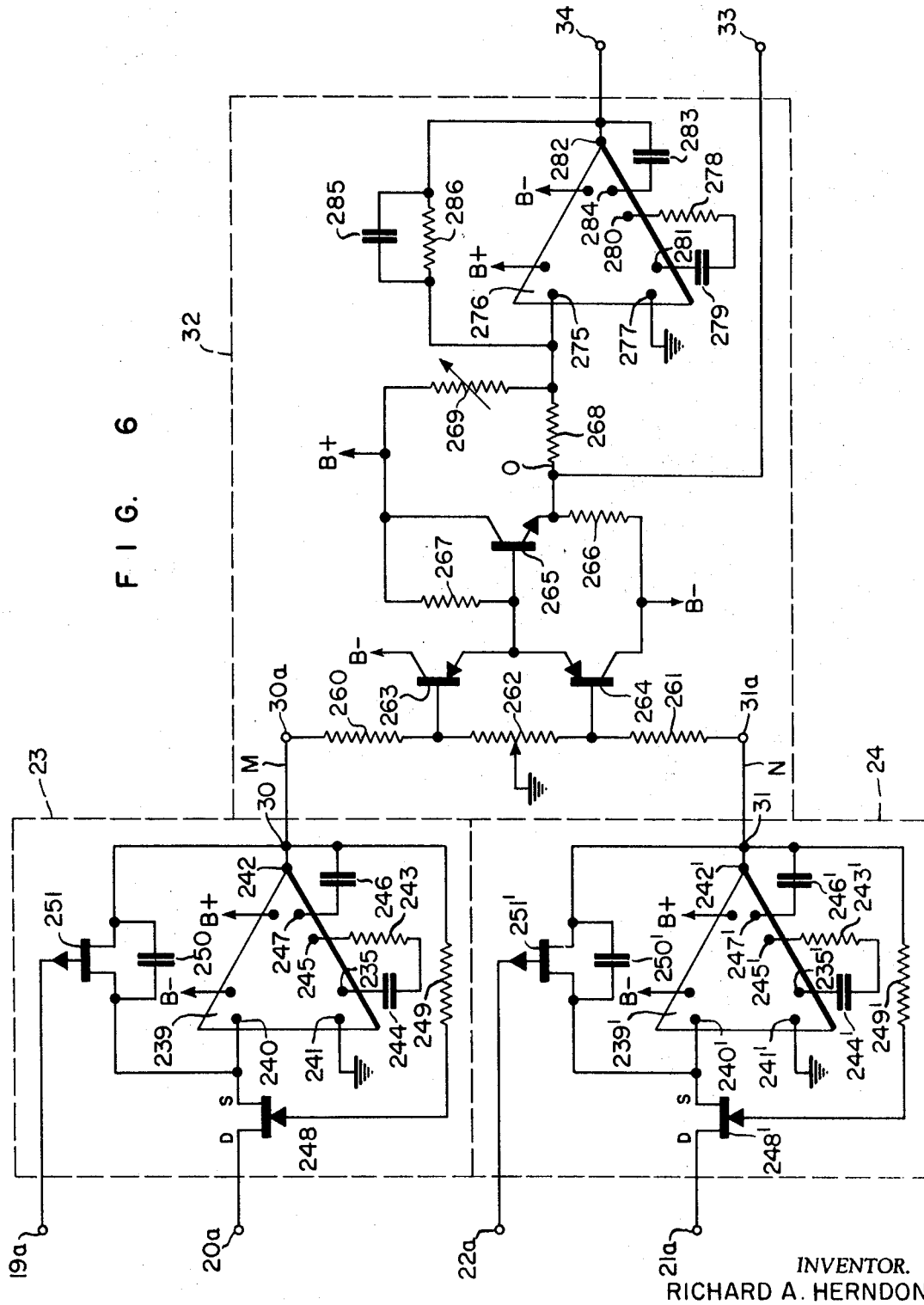

WAVEFORMS

INVENTOR.
RICHARD A. HERNDON

RATE METER, PARTICULARLY A BEAT-BY-BEAT CARDIOTACHOMETER

The present invention relates to apparatus for monitoring the rate of a recurring event, and more particularly to apparatus for monitoring the rate of body functions, such as heart beat rate or breathing rate.

Such apparatus particularly designed for monitoring heart beat rates are generally called cardiotachometers, and have been of particular utility to physicians for monitoring patients' heart beats during periods of surgery, treatment and/or experimentation. In the most part, cardiotachometers heretofore developed have been of the average rate type, i.e. cardiotachometers effective to measure the average heart beat rate, for example by counting the number of heart beats occurring over a specific interval of time. Average rate cardiotachometers, however, are subject to the significant disadvantage that they fail to provide any information with regard to the rate of single heart beats, and therefore fail to detect cardiac arrhythmia. Since arrhythmic variations of a patient's heart beat rate often anticipate heart failures such as fibrillation and cardiac arrest, it is quite apparent that it is desirable for a physician to be equipped to measure the rate of single heart beats. The aforementioned rate of a single heart beat is hereinafter referred to as the beat-by-beat heart beat rate, and is determined by reference to only the time interval between the subject heart beat whose rate is being measured and its immediate preceding beat.

It is accordingly an object of the present invention to provide a novel ratemeter, particularly a cardiotachometer for monitoring the beat-by-beat heart beat rate of a patient.

It is a further object of the present invention to provide a cardiotachometer as set forth whose output signal is characterized by being linearly proportional to the beat-by-beat heart beat rate.

It is another object of the present invention to provide a cardiotachometer as set forth which includes means for generating an alarm signal to indicate cardiac arrhythmia.

It is an additional object of the present invention to provide a cardiotachometer as set forth which includes a variable threshold level detecting means for detecting R waves of either positive or negative polarity.

It is still another object of the present invention to provide a cardiotachometer as set forth which includes novel integrating means.

In accomplishing these and other objects, there has been provided in accordance with the present invention means for detecting and amplifying the ECG signals of a patient. A band pass filter means is connected to the amplifying means and operates to pass only the R-waves of the patient's ECG. A pulse generator, including level-detecting means, is connected to the filter means to generate beat pulses in response to the R-waves. The level-detecting means has a variable threshold level and is operable to detect R-waves of either positive or negative polarity. The level detecting means is included in the pulse generator to insure that the pulse generator is responsive only to R-waves. The beat pulses are used by a control signal generator to generate control signals for controlling the operation of first and second integrators. The first and second integrators are alternatively used to generate output voltages linearly proportional to the patient's beat-by-beat heart beat rate. The output voltages are selectively transmitted to indicator means for displaying the beat-by-beat heart beat rate and to an arrhythmia indicator for indicating cardiac arrhythmia.

A better understanding of the invention may be had from the following detailed description when read in connection with the accompanying drawings in which:

FIG. 6 is a schematic diagram of the first and second integrators, and the output transmitter of FIG. 1;

Figure 1:
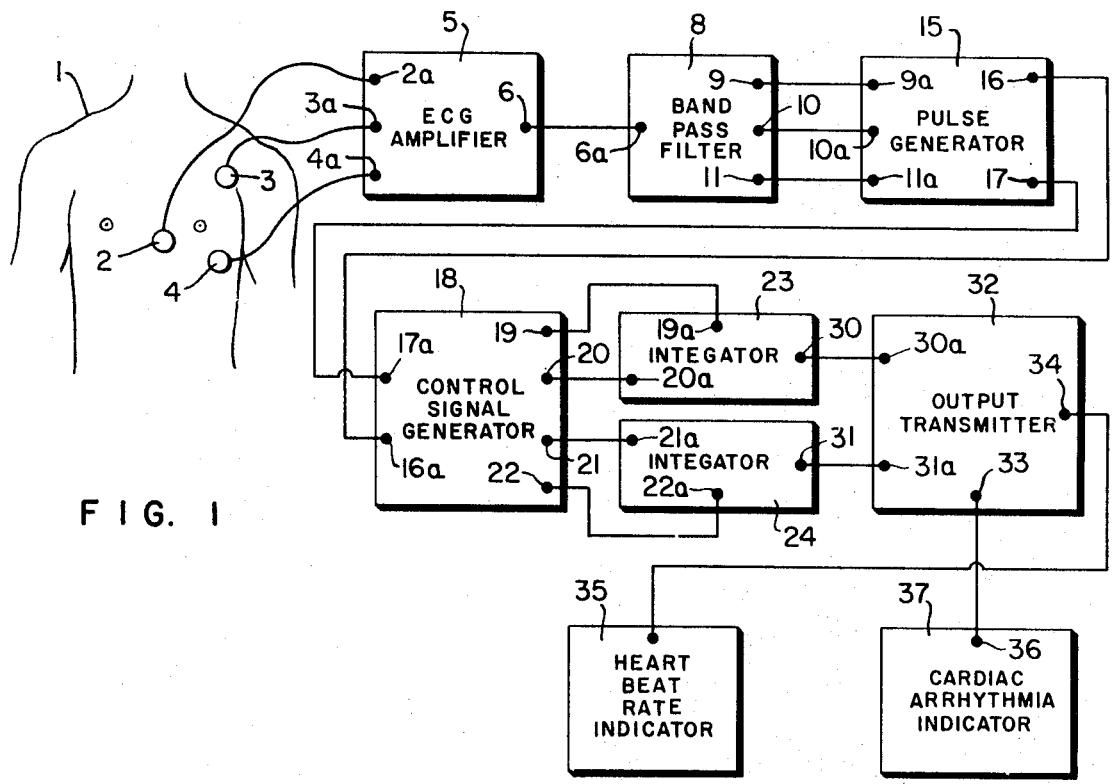
FIG. 1 is a block diagram of a cardiotachometer according to the present invention.

Referring to the drawings in more detail, there is shown in FIG. 1, body electrodes 2, 3 and 4 attached to the skin of a patient 1. The electrodes 2, 3 and 4 are connected, respectively, to input terminals 2a, 3a and 4a of an ECG amplifier 5. The amplifier 5 has an output terminal 6 which is connected to an input terminal 6a of a band pass filter 8. Output terminals 9, 10 and 11 of the filter 8 are connected, respectively, to input terminals 9a, 10a and 11a of a pulse generator 15. The pulse generator 15 has output terminals 16 and 17 which are respectively connected to input terminals 16a and 17a of a control signal generator 18. The signal generator 18 has output terminals 19, 20, 21 and 22. The output terminals 19 and 20 are, respectively, connected to a reset terminal 19a and an input terminal 20a of an integrator 23. In a like manner the output terminals 21 and 22 are connected, respectively, to an input terminal 21a and a reset terminal 22a of an integrator 24. The integrators 23 and 24 have their respective output terminals 30 and 31 connected to input terminals 30a and 31a of an output transmitter 32. The transmitter 32 has output terminals 33 and 34. The terminal 34 is connected to a heart beat rate indicator 35, and the terminal 33 is connected to input terminal 36 of a cardiac arrhythmia indicator 37.

Figure 2:
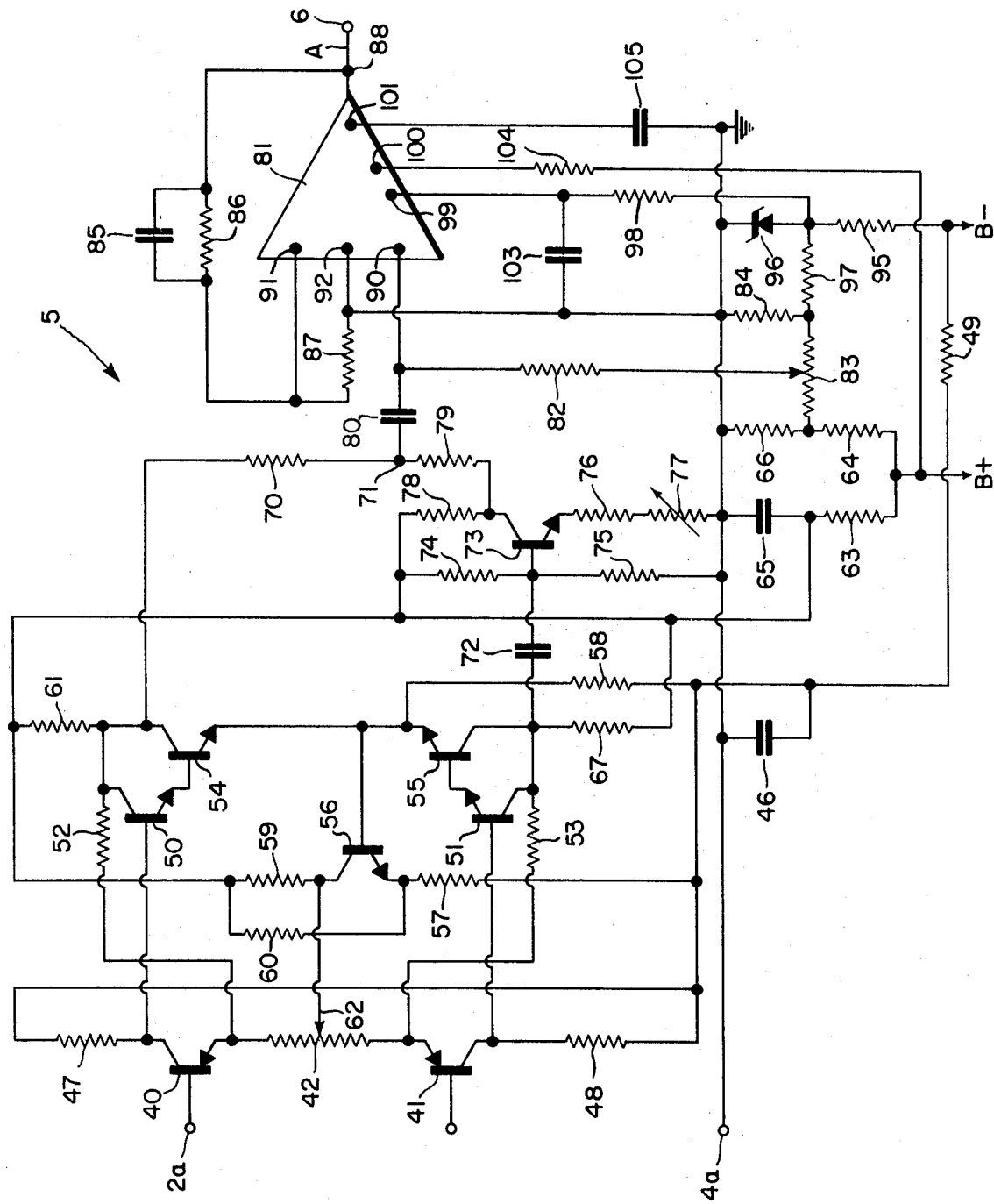
FIG. 2 is a schematic diagram of the ECG amplifier of FIG. 1.

Referring now to FIG. 2, the ECG amplifier 5 shown therein comprises a two-channel differential amplifier. The differential amplifier includes transistors 40 and 41, which transistors have their emitter electrodes commonly connected through a resistor 42. The base electrodes of the transistors 40 and 41 are connected, respectively, to the amplifier input terminals 2a and 3a, and the input terminal 4a is connected to ground. The collector electrodes of the transistors 40 and 41 are commonly connected through resistors 47 and 48, respectively. B− DC bias voltage is applied to the junction of the resistors 47 and 48 through a resistor 49.

The collector electrodes of the transistors 40 and 41 are in addition connected, respectively, to the base electrodes of the transistors 50 and 51. The collector electrodes of the transistors 50 and 51 are connected back, respectively, through resistors 52 and 53 to the emitter electrodes of the transistors 40 and 41. The emitter electrodes of the transistors 50 and 51 are connected, respectively, to the base electrodes of transistors 54 and 55. The collector electrodes of the transistors 54 and 55 are connected, in turn, to the collector electrodes of the transistors 50 and 51, respectively. The emitter electrodes of the transistors 54 and 55 are commonly connected to the base electrode of a transistor 56. B− voltage is applied to the emitter electrode of the transistor 56 through the resistor 49 and a resistor 57. Similarly, B− voltage is applied to the emitter electrodes of the transistors 54 and 55 through the resistor 49 and a resistor 58. A capacitor 46 is also connected between ground and the resistor 49 to AC coupled the B− voltage supply line to ground. The collector electrode of the transistor 56 is coupled to its emitter electrode through resistors 59 and 60. The junction between the resistors 59 and 60, in turn, is connected through a resistor 61 to the collector of the transistor 54. Further, the resistor 42 has an adjustable voltage pickoff 62 which is connected to the collector electrode of the transistor 56.

To apply positive DC bias voltage to the appropriate transistors 2+ the differential amplifier hereinbefore described, B+ potential is applied to a common junction between resistors 63 and 64. The resistors 63 and 64 are, respectively, connected to ground potential through a capacitor 65 and a resistor 66. The junction between the capacitor 65 and resistor 63 is connected through resistors 59, 61 and 67, respectively, to the collector electrodes of the transistors 56, 54 and 55. The B+ and B− voltages before and hereinafter referred to in this specification were +12 and −12 volts, respectively, in an exemplary apparatus constructed in accordance with the present invention.

The collector electrodes of the transistors 54 and 55, respectively, provide the two output terminals of the two channels of the differential amplifier above described and the collector electrode of the transistor 54 is connected through a resistor 70 to a summing junction 71. The collector electrode of the transistor 55, in turn, is connected through a capacitor 72 to the base of a transistor 73. The transistor 73 serves as a phase inverter, as is hereinafter explained. The base electrode of the transistor 73 is biased by connecting therefrom resistors 74 and 75, respectively, to the junction between the resistor 63 and the capacitor 65, and to ground. In addition, the emitter electrode of the transistor 73 is connected through the series connected resistor 76 and variable resistor 77 to ground. The collector electrode of the transistor 73 is connected through resistor 78 to the junction between the capacitor 65 and the resistor 63. Further, the output electrode of the transistor 73, i.e. its collector electrode, is connected through a resistor 79, to the summing junction 71.

The summing junction 71 is connected through a capacitor 80 to an input terminal 90 of an operational amplifier 81. The input terminal of the amplifier 81, in turn, is connected through a resistor 82 to the adjustable voltage pickoff of a resistor 83. One terminal of the resistor 83 is connected to the junction between resistors 64 and 66, and the other terminal is connected through resistor 84 to ground. The amplifier 81 is a linear integrated circuit of the type manufactured by Fairchild Semiconductor under modes $\mu 702c$. A description of such an amplifier may be found in the Fairchild Semiconductor specification sheet titled $\mu 702C$ HIGH GAIN, WIDEBAND D. C. AMPLIFIER dated March 1967. The output terminal 88 of the amplifier 81 is fed back to a second input terminal 91 through a network comprising a parallel connected capacitor 85 and resistor 86. A resistor 87 is connected between the terminal 91 and a reference terminal 92 of the amplifier 81. Ground is applied to the terminal 92.

To provide supply voltage for the amplifier 81, a resistor 95 and a zener diode 96 are connected in series. The zener diode 96 is connected to ground and B− voltage is applied to the resistor 95. In addition, one terminal of a resistor 97 is connected to the junction between the resistor 83 and 84. The other terminal of the resistor 97 is connected to the junction between the zener diode 96 and the resistor 95. The junction between the resistor 95 and the diode 96, in turn, is connected through a resistor 98 to the amplifier voltage supply terminal 99 to apply a negative bias to the operational amplifier 81. Further, the terminal 99 is AC coupled to ground through a capacitor 103. B+ bias potential is applied to amplifier voltage supply terminal 100 through a resistor 104. A capacitor 105 is connected between ground and a frequency compensation terminal 101 to frequency compensate the amplifier 81. Additionally, the output terminal 88 of the amplifier 81 is connected to ECG amplifier output terminal 6.

Figure 3:
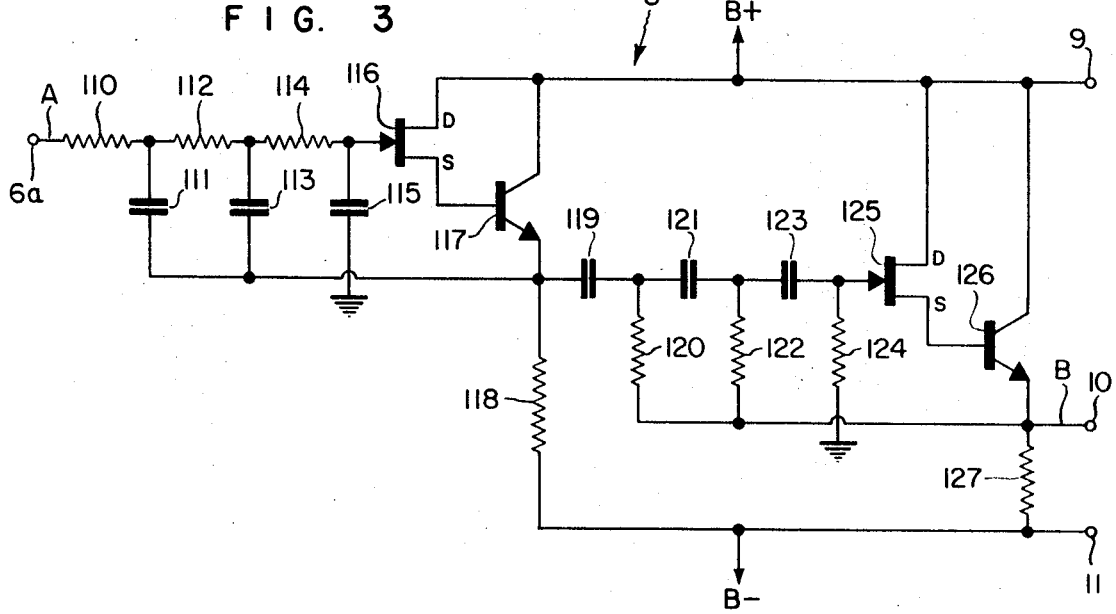
FIG. 3 is a schematic diagram of the band pass filter of FIG. 1.

The band pass filter 8 shown in FIG. 3 is an active band pass filter. Connected to its input terminal 6a is a resistor 110. The resistor 110, in turn, is connected with a capacitor 111 to form a low-pass filter stage. Similarly connected across the capacitor 111 is a second low-pass filter stage formed by a resistor 112 and a capacitor 113. A third low-pass filter stage comprised of a resistor 114 and a capacitor 115 is connected to ground from the junction between the resistor 112 and the capacitor 113. The junction between the resistor 114 and the capacitor 115 is connected to the gate electrode of an FET semiconductor 116. The FET 116 has drain and source electrodes appropriately labeled D and S. B+ is applied to the drain electrode of the FET 116 and its source electrode is connected to the base electrode of a transistor 117. The collector electrode of the transistor 117 is connected to B+ and B− is applied to the emitter electrode of the transistor 117 through a resistor 118. The capacitors 111 and 113 are additionally commonly connected to the emitter electrode of the transistor 117.

A capacitor 119 is connected to the emitter electrode of the transistor 117. The capacitor 119 is further connected to a resistor 120 to form a high-pass filter stage. A second high-pass filter stage formed by a capacitor 121 and a resistor 122 is connected across the resistor 120. A third high-pass filter stage comprised of a capacitor 123 and a resistor 124 is connected from the junction between the capacitor 121 and the resistor 122 to ground. The junction between the capacitor 123 and the resistor 124 is connected to the gate electrode of an FET 125. The FET 125 has drain and source electrodes appropriately labeled D and S. The source electrode of the FET 125 is connected to the base of a transistor 126. The drain electrode of the FET 125 and the collector electrode of the transistor 126 are commonly connected to B+. B− is applied to the emitter electrode of the transistor 126 through a resistor 127. The capacitors 120 and 122 are in addition commonly connected to the emitter electrode of the transistor 126. Filter output terminal 10 is connected to the emitter electrode of the transistor 126. The filter output terminals 9 and 11 are connected, respectively, to B+ and B−.

Figure 4:
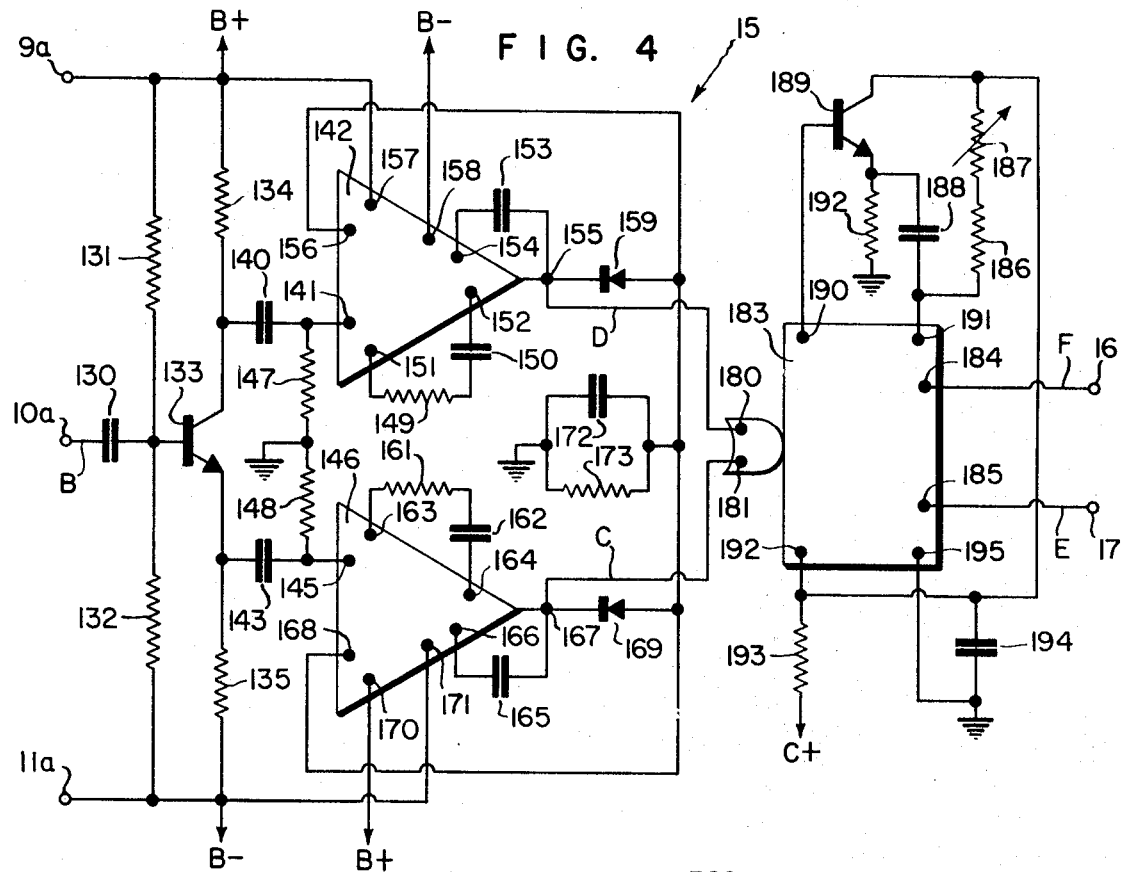
FIG. 4 is a schematic diagram of the pulse generator of FIG. 1 including therein a level-detecting means.

FIG. 4 shows a coupling capacitor 130 connected to the pulse generator input terminal 10a. Resistors 131 and 132, respectively, are connected between the capacitor 130 and the pulse generator input terminals 9a and 11a. The input terminals 9a and 11a are connected to B+ and B−, respectively. The junction between the resistors 131 and 132 is connected to the base electrode of a transistor 133. B+ is applied to the collector electrode of the transistor 133 through a resistor 134. Similarly, B− is applied to the emitter electrode of the transistor 133 through a resistor 135.

The electrode of the transistor 133 is connected through a capacitor 140 to the noninverting input terminal 141 of an operational amplifier 142. In a like manner, The emitter electrode of the transistor 133 is connected through a capacitor 143 to the noninverting input terminal 145 of an operational amplifier 146. Connected between the input terminals 141 and 145 are resistors 147 and 148, respectively, with the junction between resistors 147 and 148 connected to ground. The operational amplifiers 142 and 146 used in the preferred form of the present invention were each a linear integrated circuit of the type manufactured by Fairchild Semiconductor under model $\mu A709C$. A description of such an amplifier can be found in the Fairchild Semiconductor specification sheet titled $\mu A709C$—- HIGH PERFORMANCE OPERATIONAL AMPLIFIER dated March 1967. Concerning the amplifier 142, a resistor 149 and a capacitor 150 are connected between terminals 151 and 152 to provide input frequency compensation. A capacitor 153 is also connected between amplifier terminal 154 and its output terminal 155 to provide output frequency compensation. The terminal 155 in turn is fed back through a diode 159 to the inverting input terminal 156. B+ and B− voltages are supplied to voltage supply terminals 157 and 158, respectively.

With regard to the operational amplifier, 146, a resistor 161 and a capacitor 162 are connected between terminals 163 and 164 to provide input frequency compensation. A capacitor 165 is connected between a terminal 166 and output terminal 167 to provide output frequency compensation. The output terminal 167 is connected back to the inverting input terminal 168 through a diode 169. B+ and B− voltage are supplied to voltage supply terminals 170 and 171, respectively.

The operational amplifiers 142 and 146 serve as level detectors and produce a negative output signal when a negative input signal exceeding a variable threshold level is applied to their input terminals 141 or 145, respectively. The threshold level is determined by the instant charge present on a capacitor 172, which capacitor is connected in parallel with a resistor 173. The capacitor 172 and 173 are connected between ground and a common junction between the diodes 159 and 169. The capacitor 172 is negatively charged each time an output signal is generated by one or the other of the amplifiers 142 or 146. The negative charge on the capacitor 172 is applied to the amplifier input terminals 156 and 168 thereby to establish for each of the amplifiers 142 and 146 a threshold level which must be exceeded before an output signal will be generated at their respective output terminals 155 or 167. The threshold level established by the negative charge on the capacitor 172 is proportional to the level of the input signals received by the amplifiers 142 and 146, and is variable, decaying exponentially with time as the capacitor 172 discharges through the resistor 173. The output terminals 155 and 167 are connected to an OR network having input terminals 180 and 181, respectively, which OR network is part of a monostable multivibrator 183.

The monostable multivibrator 183 used in the exemplary form of the present invention was a monostable multivibrator circuit Model number MC851 manufactured by Motorola. The multivibrator 183 provides complementary output pulses at its output terminals 184 and 185 in response to an input signal. The output pulse width is determined by an RC time constant provided by a resistor 186, a variable resistor 187 and a capacitor 188, which are correspondingly series connected across the collector-emitter path of a transistor 189. The base electrode of the transistor 189 is connected to a terminal 190 of the multivibrator 183, and the junction between the capacitor 188 and the resistor 186 is connected to a multivibrator terminal 191. The emitter electrode of the transistor 189 is connected to ground through a resistor 192. C+ DC bias potential is supplied to the multivibrator 183 at a supply voltage terminal 192 through a resistor 193. C+ potential is similarly applied to the collector electrode of the transistor 189 through the resistor 193. The multivibrator terminal 192 is AC coupled to ground through a capacitor 194, and ground is applied to a supply voltage terminal 195. The multivibrator output terminals 184 and 185 further are connected to the pulse generator output terminals 16 and 17, respectively. The C+ voltage above and hereinafter referred to in this specification was +5 volts in an exemplary apparatus constructed in accordance with the present invention.

Figure 5:
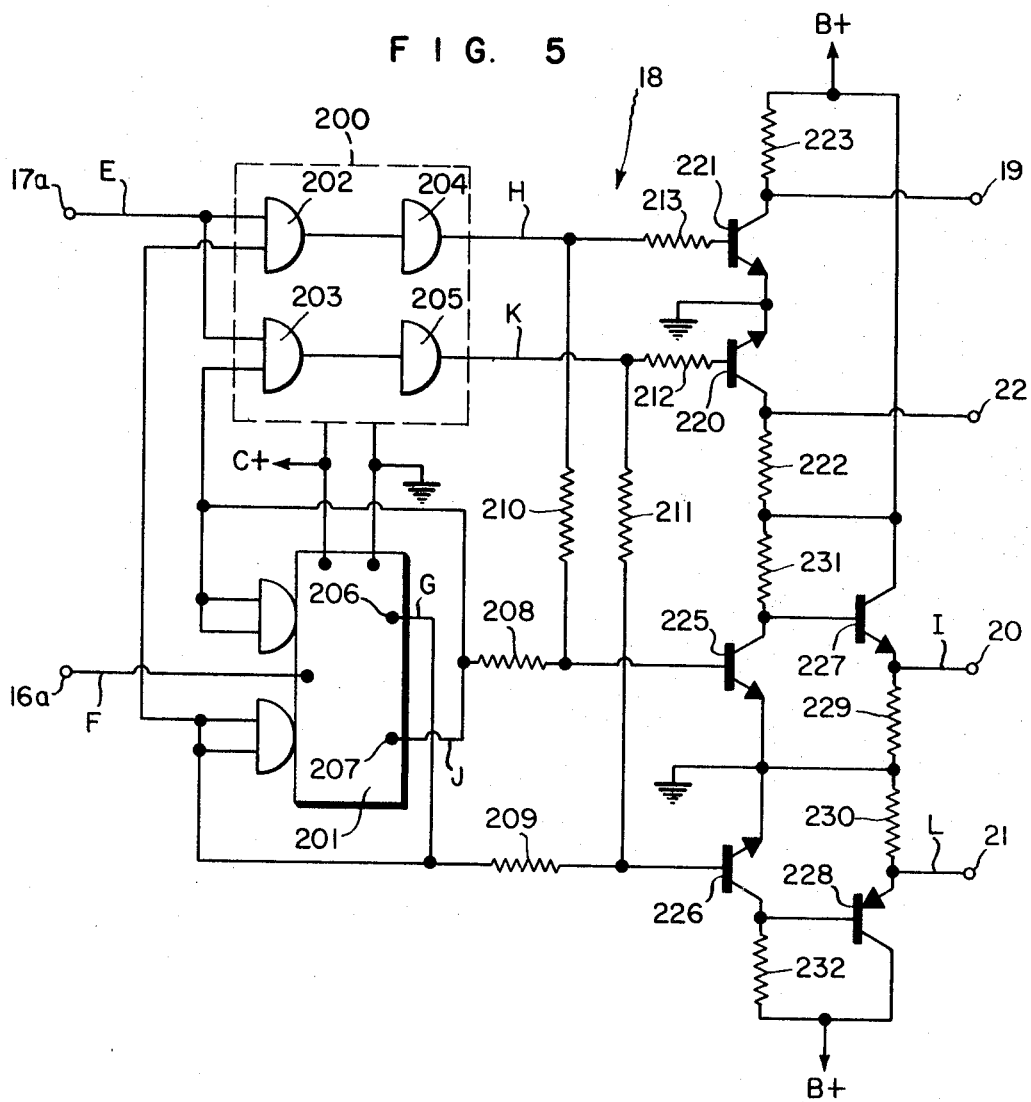
FIG. 5 is a schematic diagram of the control signal generator of FIG. 1.

Referring now to FIG. 5, the control signal generator 18 shown therein includes integrated logic components 200 and 201. The components 200 and 201 used in an exemplary form of the present invention were, respectively, model number MC 846P and MC 845P integrated circuits components manufactured by Motorola. The circuit component MC 846P, as used in the present invention, provides dual input AND gates 202 and 203, respectively, connected in series with single input AND gates 204 and 205. The gates 204 and 205 serve, respectively, as signal-inverting amplifiers to provide positive pulses at their output terminals.

The circuit component MC 845P, used as logic circuit component 201, provides a clocked flip-flop at output terminals 206 and 207. The output terminals 206 and 207 are appropriately connected back to the input terminals of the flip-flop 201 for proper operation of the circuit component MC 845P. The trigger terminal of the flip-flop 201 is connected to the signal generator input terminal 16a, thereby to be triggered between its two output states by the clock signal appearing on terminal 16a. The flip-flop terminals 206 and 207 are, respectively, connected to one input terminal of the gates 202 and 203. The second input terminal of each of the gates 202 and 203 is connected to the signal generator input terminal 17a. C+ and ground potential are supplied to appropriate supply voltage terminals of each of the components 200 and 201.

Connected to the flip-flop output terminals 206 and 207 are resistors 208 and 209, respectively. The resistors 208 and 209 are connected, in turn, to resistors 210 and 211, respectively. The resistors 210 and 211 are connected, respectively, to resistors 213 and 212. The output terminal of the gate 204 is connected to the junction between the resistors 210 and 213. Likewise the output terminal of the gate 205 is connected to the junction between the resistors 211 and 212.

The resistors 212 and 213 are connected, respectively, to the base of transistor 220 and 221. The transistors 220 and 221 are connected in a common emitter configuration, each having their emitter electrodes connected to ground. B+ is applied to the collector electrodes of the transistors 220 and 221, respectively, through resistors 222 and 223. The collector electrodes of the transistors 220 and 221 are also connected to the signal generator output terminals 22 and 19, respectively.

The junction between resistors 208, 210 and 209, 211 are, respectively, connected to the base electrodes of transistors 225 and 226. The emitter electrodes of the transistors 225 and 226 are commonly connected to ground, and their collector electrodes are connected to the base electrodes of transistors 227 and 228, respectively. The emitter electrodes of the transistors 227 and 228 are connected through resistors 229 and 230, respectively to ground. B+ is applied directly to the collector electrode of the transistor 227 and to the collector electrode of the transistor 225 through a resistor 231. Similarly, B+ is applied directly to the collector electrode of the transistor 228 and to the collector electrode of transistor 226 through a resistor 232. The signal generator output terminals 20 and 21 are connected to the emitter electrodes of the transistors 227 and 228, respectively.

The integrators 23 and 24, and the output transmitter 32 are shown in FIG. 6, each enclosed in a separate dotted rectangle. The integrator 23 includes an operational amplifier 239 having an inverting input terminal 240, a noninverting input terminal 241 and an output terminal 242. The amplifier 239 used in a preferred form of the present invention was a high gain integrated operational amplifier of the type manufactured by Fairchild Semiconductor under number $\mu$A 709 C. Such a model integrated operational amplifier was discussed earlier in this specification in connection with FIG. 4.

A resistor 243 and a capacitor 244 are connected across terminals 235 and 245 of the amplifier 239 to provide input frequency compensation. Further, a capacitor 246 is connected from amplifier terminal 247 to its output terminal 242 to provide output frequency compensation. The drain and source electrodes of and FET 248 labeled, respectively, D and S are connected between the integrator input terminal 20a and the amplifier inverting input terminal 240. The gate electrode of the FET 248 is connected through a resistor 249 to the amplifier output terminal 242. Connected between the amplifier terminals 240 and 242 is a capacitor 250. The drain to source current path of an FET 251 is further connected in parallel with the capacitor 250. The gate electrode of the FET 251 is connected to the integrator reset terminal 19a. Additionally, the amplifier noninverting input terminal 241 is connected to ground, and the output terminal 242 is connected to the integrator output terminal 30. B+ and B− voltages are applied to the voltage supply terminals of the amplifier 239.

Since the integrator 24 is identical with the integrator 23, the elements therein have been assigned numbers, with primes added, which correspond to their counterparts in the integrator 23. The above description given in relation to the integrator 23 is also applicable for the integrator 24 with the exceptions, that the gate electrode of the FET 251' is connected to integrator reset terminal 22a, that the drain electrode of the FET 248' is connected to the integrator input terminal 21a, and that the amplifier output terminal 242' is connected to the integrator output terminal 31.

Concerning the output transmitter 32, the input terminals 30a and 31a thereof are connected, respectively, to resistors 260 and 261. The resistors 260 and 261 are further interconnected by a resistor 262. The resistor 262 has an adjustable voltage pickoff which is connected to ground. The junction between the resistors 260 and 262 is connected to the base of a transistor 263. In a like manner, the junction between the resistors 261 and 262 is connected to the base of a transistor 264. The emitter electrodes 263 and 264. The emitter electrodes of the transistors 263 and 264 are commonly connected to the base of a transistor 265. B− potential is applied to the collector electrodes of the transistor 263 and 264. B− potential is also applied through a resistor 266 to the emitter electrode of the transistor 265. The transistor 265 has B+ applied to its collector electrode and a resistor 267 connected between its base and collector electrode and a resistor 267 connected between its base and collector electrodes. The emitter electrode of the transistor 265 is connected to the transmitter output terminal 33, and the emitter and collector electrodes of the transistor 265 are interconnected through a resistor 268 and a variable resistor 269, respectively.

The junction between the resistors 268 and 269 is connected to the inverting input terminal 275 of an operational amplifier 276. The amplifier 276 used in a preferred form of the present invention was a high-gain operational amplifier of the type before discussed, and manufactured by Fairchild Semiconductor under Model No. $\mu$A 709 C. The noninverting input terminal 277 of the amplifier 276 is connected to ground. A resistor 278 and a capacitor 279 are connected between amplifier terminals 280 and 281, respectively, to provide input frequency compensation. The amplifier 276 has an output terminal 282, and the terminal 282 is connected to the transmitter ultimate output terminal 34. A capacitor 283 is connected between the output terminal 282 and amplifier terminal 284 to provide output frequency compensation. A capacitor 285 and a resistor 286 are connected in parallel between the output terminal 282 and the input terminal 275. B+ and B− voltages are applied to the voltage supply terminals of the amplifier 276.

Figure 7:
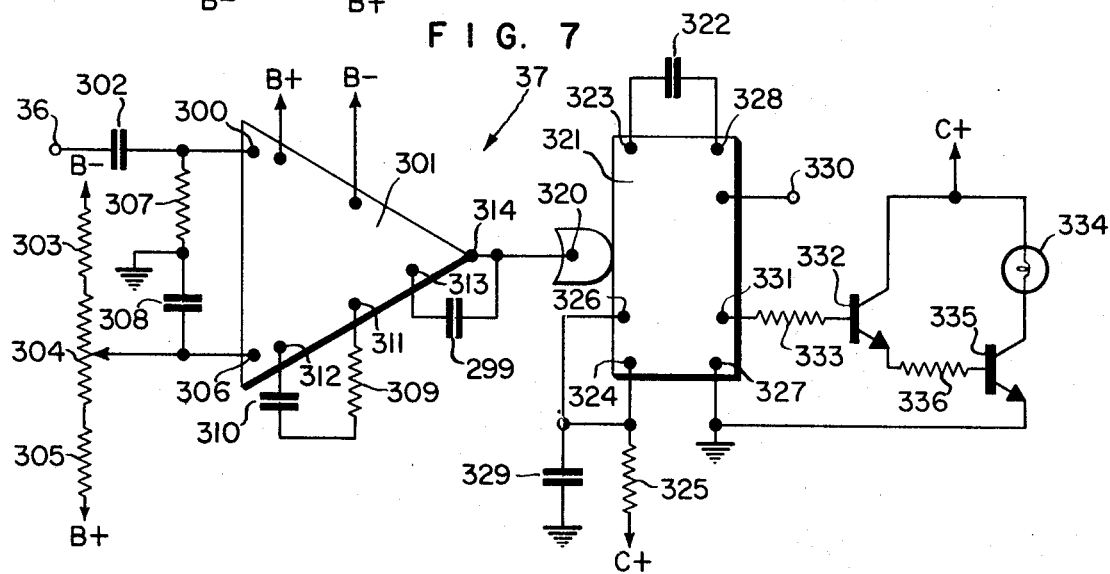
FIG. 7 is a schematic diagram of the cardiac arrhythmia indicator of FIG. 1.

Referring now to FIG. 7, the input terminal 300 of an operation amplifier 301 is connected through a capacitor 302 to the input terminal 36 of the cardiac arrhythmia indicator 37. B− and B+ voltages are applied across series connected resistors 303, 304 and 305 to develop a bias voltage at the adjustable voltage pickoff of the resistor 304. The voltage pickoff of the resistor 304 is connected to the amplifier input terminal 306. A resistor 307 is connected between the terminal 300 and ground. The terminal 306 is AC coupled to ground through a capacitor 308. The amplifier 301 used in an exemplary form of the present invention was a model $\mu$A 709 C high-gain integrated operational amplifier manufactured by Fairchild Semiconductor. A resistor 309 and a capacitor 310 are connected between amplifier terminals 311 and 312 to provide input frequency compensation. A capacitor 299 is connected between amplifier terminal 313 and its output terminal 314 to provide output frequency compensation. B+ and B− are applied to supply voltage terminals of the amplifier 301.

The amplifier output terminal 314 is connected to the input terminal 320 of an OR network, which OR network is part of a monostable multivibrator 321. The multivibrator 321 used in an exemplary form of the present invention was a model No. MC 851 integrated circuit multivibrator manufactured by Motorola. The multivibrator 321 is connected in a conventional manner and has a capacitor 322 connected between terminals 323 and 328 to establish the duration of the multivibrator output pulse. C+ is applied to voltage supply terminal 324 through resistor 325. The terminal 324 is commonly connected with input terminal 326, and both terminals are AC coupled to ground through a capacitor 329. Ground potential is applied to voltage supply terminal 327.

The multivibrator 321 has output terminals 330 and 331 upon which complementary output pulses appear. The terminal 330 is shown unused but could be connected to a meter, speaker or other appropriate output device. The output terminal 331 is connected to the base of a transistor 332 through a resistor 333. C+ is applied to the collector electrode of the transistor 332. The emitter electrode of the transistor 332 is connected to the base electrode of the transistor 335 through a resistor 336. The transistor 335 has a lamp 334 connected between its collector electrode and C+ potential. The emitter electrode of the transistor 335 is connected to ground.

Figure 8:
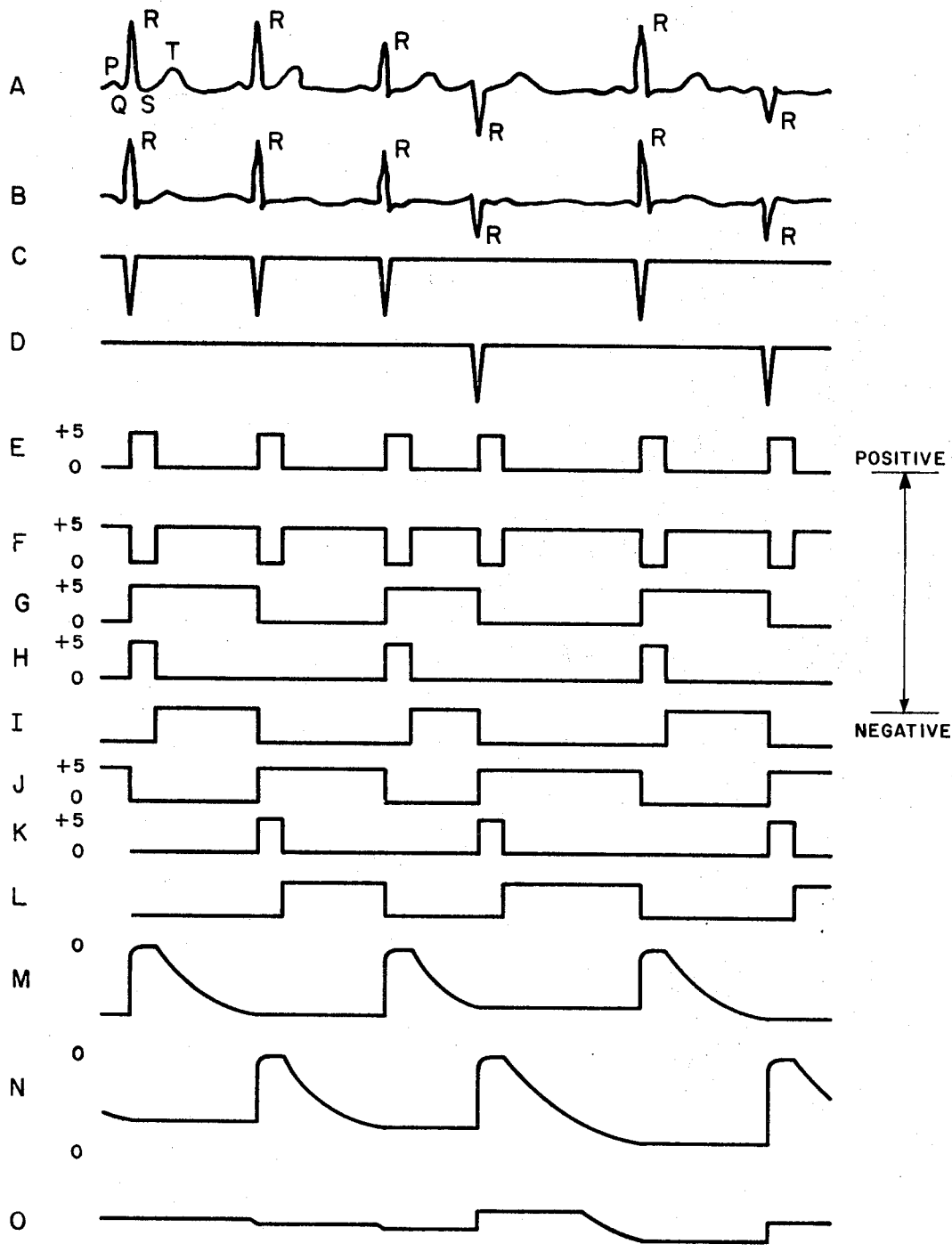
FIG. 8 is a pictorial illustration of waveforms generated in the cardiotachometer of the present invention during the processing of a series of ECG signals.

FIG. 8 pictorially shows waveforms A–O which illustrate signals generated in the cardiotachometer of the present invention during the processing of a series of ECG signals. The signals represented by the waveforms A–O are hereinafter referred to during the discussion of the operation of the exemplary cardiotachometer, and the point at which they occur in the cardiotachometer, circuitry are identified in the FIGS. 2–7.

In operation of the present invention, the body electrodes 2–4 provide terminal means for receiving ECG signals from the skin of the patient 1 and for transmitting the signals received to the ECG amplifier 4. The electrodes 2 and 3 are positioned on opposite sides of the patient's heart, as shown in FIG. 1, thereby to detect substantially the maximum potential difference developed during each heart beat. The electrode 4 is grounded and placed approximately equidistant from each electrode 2 and 3, thereby to provide a common reference potential. The ECG potential transmitted by the electrode 2 is amplified by the differential amplifier channel comprised of the transistors 40, 50 and 54, and appears as a first differential output signal on the collector electrode of the transistor 54. The ECG potential transmitted by the body electrode 3 is amplified by the differential amplifier channel comprised of the transistors 41, 51 and 55, and appears as a second differential output signal on the collector electrode of the transistor 55.

Since extraneous electrical signals, i.e. electrical signals which are not representative of the patient's ECG often are also transmitted by the body electrodes 2–4, the aforementioned first and second differential output signals may each be thought of as having an ECG and an extraneous component. The ECG components of the first and second differential output signals are 180° out-of-phase, relative to each other, while the extraneous components are predominatly in-phase. To eliminate a high percentage of these extraneous components, i.e. to accomplish common mode rejection, the signals appearing on the emitter electrodes of the transistor 54 and 55 are added and fed back through the transistor 56 to the emitter electrodes of the transistors 40 and 41. This feedback circuit serves to reject the common mode extraneous input signal components so that the average collector voltage and collector currents of the transistors 40 and 41 will be constant regardless of the average voltage input level on terminals 2a and 3a. Further to insure high common mode rejection, the second differential output signal is then phase inverted by the transistor 73. The first differential output signal and the phase inverted second differential output signal are summed at the summing point 71 whereat the ECG components combine into a single ECG signal, and any residual extraneous components effectively cancel since they have now been shifted out-of-phase with respect to each other.

The ECG signals at summing point 71 are amplified by the operational amplifier 81 and are transmitted therefrom to the active band-pass filter 8. A typical ECG illustrating six heart beats, some appearing as signals of positive and others of negative polarity, is shown by waveform A of FIG. 8 as they would appear at the ECG amplifier output terminal 6. The first heart beat of the waveform A is lettered in the conventional manner to indicate the P, Q, R, S and T waves associated with a normal heart beat. In the subsequent heart beats, however, only the R-waves are indicated. The band pass filter 8 is designed to have a band pass of substantially 12 to 18 hertz. The 12 to 18 hertz frequency band is particularly selected since only the R-wave of the ECG signals has its major frequency components within this band. The frequency of an R-wave is generally about 15 hertz. Therefore, the band pass filter 8 is effective to attenuate substantially all the components of the ECG is shown in waveform A, except the R-waves. the filtered ECG is shown as waveform B in FIG. 8 as it would appear at filter output terminal 10.

The filtered ECG shown as the waveform B is fed to the pulse generator 15 and more specifically to the base of the transistor 133 therein. The transistor 133 acts as a phase splitter, transmitting a noninverted R-wave to the input terminal 145 of the amplifier 146, and an inverted R-wave to the input terminal 141 of the amplifier 142. Each amplifier 142 and 146 serves as a level detector operable only to produce a sharp negative output pulse in response to those negative input pulses having magnitudes exceeding the amplifiers' instant threshold level. As mentioned before in connection with FIG. 4, this threshold level is variable and is determined by the instant negative charge present on the capacitor 172. Each time one of the amplifiers 142 or 146 develops a negative output pulse, such pulse is transmitted through the respective diodes 159 or 169 to charge the capacitor 172, thereby to establish an initial threshold level proportional to the level of R-wave received. The value of the threshold level thereafter decreases exponentially with time since the capacitor 172 discharges through the resistor 173. The variable threshold level naturally continues to decay until another amplifier output pulse is generated to recharge the capacitor 172, and thereby establish a new initial threshold level.

Considering again the R-waves shown in the waveform B it is here assumed that the magnitude of each R-wave exceeds the amplifier variable threshold level associated therewith. This is a reasonable assumption since the level detectors provided by the amplifiers 142 and 146 are specifically designed to provide a variable threshold level which will be exceeded by each R-wave, but will not be exceeded by other relatively lower level signals which may be passed by the filter 8. Therefore, the first, second, third and fifth R-waves of the waveform B are fed as inverted negative pulses to the amplifier input terminal 141 and the amplifier 142 generates at its output terminal 155 the negative output pulses shown by the waveform C of the FIG 8. Similarly, the fourth and sixth R-waves of the waveform B are fed noninverted to the input terminal 145 of the amplifier 146, thereby to generate the negative output pulses shown by the waveform D at the amplifier output terminal 167.

The amplifier output pulses shown by the waveforms C and D are each transmitted to input terminals of the multivibrator 183 whereupon and in response thereto signals represented by the waveforms E and F are, respectively, generated at the multivibrator output terminals 185 and 184. The negative going pulses illustrated by the waveform F are transmitted to the trigger terminal of the flip-flop 201, and the positive going pulses illustrated by the waveform E are transmitted to the AND gates 202 and 203 of the integrated logic circuit 200.

The flip-flop 201 generates the complementary signals represented by the waveforms G and J at output terminals 206 and 207, respectively. These complementary signals represented by the waveforms G and J are generated in response to the negative pulse portions of the waveform F which are applied as clock pulses to the trigger terminal of the flip-flop 201. The signals represented by the waveforms G and J are used as input signals for the AND gates 202 and 203, respectively. Since as before mentioned, the positive pulses illustrated by the waveform E are also transmitted as input signals to the AND gates 202 and 203, positive output pulses will, therefore, appear at the output of the gate 204 when the positive portions of the waveforms E and G are coincident, and as the output of the gate 205 when the positive portions of the waveforms E and J are coincident. The output pulses of the gates 204 and 205 are shown as the waveforms H and K, respectively.

An integration cycle will now be described to illustrate how the control signals represented by the waveforms G, H, J and K control the operation of the integrators 23 and 24. At the instant of time corresponding to the first R-wave, the portion of the signals represented by the waveforms G and H are positive at C potential, which potential was 5 volts in an exemplary cardiotachometer. At the same instant, the portions of the signals represented by the waveforms J and K are ground or zero potential. The short duration +5 volt pulse in the waveform H causes the transistor 221 to briefly conduct. The conduction of the transistor 221 causes a voltage drop on the collector electrode thereof, and a corresponding drop in the voltage applied to the gate of the FET 251. The resistance of the source-to-drain current path of the FET 251 as a result substantially decreases, and the capacitor 250 discharges therethrough. In this manner, the capacitor 250 is reset to its initial condition of zero charge and potential. At the same instant the transistor 220 is not conducting, since zero potential is applied to the base electrode thereof as shown by the waveform K. The voltage on the collector electrode of the transistor 220 and applied to the gate electrode of the FET 251' thus remains high, with the result that the resistance of the source-to-drain current path of the FET is effectively equal to infinity. Therefore, the capacitor 250' does not discharge, but rather holds or accumulates charge.

The short duration +5 volt pulse of waveform H is effective to bias the transistor 225 into conduction simultaneously with resetting the capacitor 250. With the transistor 225 thus conducting during the reset interval, the voltage generated at its collector electrode is a very low potential, which potential is insufficient to bias the transistor 227 into condition. The voltage on the emitter electrode of the nonconducting transistor 227 then is zero volts and no voltage is applied to the integrator terminal 20a to drive the integrator 23 during the reset interval. Once reset is completed, however, the signal represented by the waveform H decreases to zero volts. Since the signal represented by the waveform J is already zero volts, the transistor 225 now becomes nonconducting. With the transistor 225 not conducting, its collector electrode is at approximately B+ potential, which potential was +12 volts in the exemplary cardiotachometer. This +12 volts is transmitted to the base electrode of the transistor 227 whereupon the transistor 227 is biased into conduction. A constant positive voltage then appears upon the emitter electrode of the transistor 227 and is transmitted to the integrator terminal 20a to drive the integrator 23. The constant positive voltage appearing on the terminal 20 and the time interval during which the integrator 23 actually integrates are both indicated by the positive portions of the waveform I.

During the same time period discussed above, the waveform G is positive and biases the transistor 226 into conduction. With the transistor 226 conducting, the voltage generated at its collector electrode is a very low potential which is insufficient to bias the transistor 228 into conduction. The voltage on the emitter electrode of the nonconducting transistor 228 is therefore zero volts and no voltage signal is applied to the integrator terminal 21a to drive the integrator 24. The signal on the terminal 21 is represented by the waveform L. It is noted that during this time interval which the integrator 24 is not integrating, the signal represented by the waveform K has remained zero volts with the result that the capacitor 250' is not reset and holds the charge accumulated during its last cycle of integration.

An object of the present invention is to provide a cardiotachometer having an output signal which varies linearly with respect to the beat-by-beat heart beat rate. Therefore, since the beat-by-beat heart beat rate is linearly proportional to the reciprocal of the TIME interval since the last R-wave the output voltage of the integrator 23 or 24 must then be proportional to 1/TIME. The manner in which this linear relationship is accomplished will now be illustrated by continuing with the explanation of a cycle of integration.

As before mentioned, once reset of the capacitor 250 is completed a constant voltage will appear on the emitter electrode of the transistor 227. This constant voltage is applied to the integrator terminal 20a and the integrator 23 then commences to operate. The output voltage at the integrator output terminal 30 is equal to the charge accumulated on the capacitor 250 and is shown by the waveform M. As may be seen by regarding the waveform M, the output voltage was zero volts during the time interval in which the capacitor 250 was reset since during that time interval the capacitor 250 discharged any charge having been accumulated through the source-to-drain current path of the FET 251. With the completion of reset, however, and the simultaneous commencement of the operation of the integrator 23, the capacitor 250 will accumulate charge as is now described. At the instant of the commencement of operation, the voltage on the gate electrode of the FET 248 is zero volts, its source-to-drain resistance is relatively low, and a relatively high current initially flows through the source-to-drain current path of the FET 248 to the amplifier input terminal 240. The amplifier 239 amplifies this current whereupon the capacitor 250 commences to be negatively charged at a rapid rate. As the capacitor 250 accumulates charge, an increasingly negative voltage appears on the output terminal 30. This output voltage is fed back continuously to the gate electrode of the FET 248 to thereby continuously control the source-to-drain resistance of the FET 248. The result of feeding back the negatively increasing output voltage is that the source-to-drain resistance of the FET 248 correspondingly continuously increases and this resistance increase causes the input current to the amplifier terminal 240 to continuously decrease. As the input current decreases, the rate at which the capacitor 250 charges correspondingly continuously decreases. The result of such a novel method of integration using this output voltage feedback is the generation by the integrator 23 of an output voltage whose magnitude is proportional to 1/TIME and is shown by the waveform M.

The integrator 23 continues to operate until the occurrence of the second R-waves At that instant, the signals represented by the waveforms J and K become +5 volts while the signals represented by the waveforms G and H are zero volts. The short +5 volt pulse shown in the waveform K then causes the transistor 220 to conduct and reset the capacitor 251′. Simultaneously, the positive voltage shown in the waveform J causes the transistor 225 to conduct, thereby stopping the conduction of the transistor 227 and dropping the voltage on the emitter electrode of the transistor 227 to zero volts. Thus, a constant positive voltage no longer drives the integrator 23 and it stops integrating, as shown by the waveform I. The charge accumulated on the capacitor 250 which is equal to the negative voltage on the integrator output terminal 30 then linearly indicates the beat-by-beat heart beat rate as measured between the first and second R-waves. During reset of the capacitor 250′, the same +5 volt short duration pulse of the waveform K simultaneously operates to keep the transistor 226 biased into conduction. Once this reset is complete, however, this voltage ceases to be applied to the base of the transistor 226, and the transistor 226 ceases to conduct. With the transistor 226 not conducting, the transistor 228 is biased into conduction and a constant positive voltage is then applied to the terminal 21a of the integrator 24. The integrator 24 then commences to operate in the same manner as before described for the integrator 23. The positive portions of the waveform L illustrate the time during which the integrator 24 integrates. The integrator output voltage generated at the terminal 31 is shown by the waveform N. The integrator 24 operates until the occurrence of the third R-wave whereupon the above described integration cycle for the integrator 23 is recommended. The integrators 23 and 24 thus alternately operate to measure the beat-by-beat heart rate of respective R-waves shown by the waveform B.

The waveforms M and N indicate the voltages generated by the integrators 23 and 24 at the output terminals 30 and 31, respectively, during the processing of the six R-waves shown in waveform B. The output voltages on the terminals 30 and 31, are, respectively, applied to the base of the transistors 263 and 264 in the output transmitter 32. The transistors 263 and 264 act as an OR circuit always passing to the transistor 265 only the most negative voltage always indicates the longest time interval of integration. The low output voltage passed is shown by the waveform 0, which waveform is constructed from the waveforms M and N by taking the most negative portions of each. The signals represented by the waveform 0 appear on the emitter electrode of the transistor 265 and are amplified by the amplifier 276. Amplifier 276 also provides a DC voltage shift which may be adjusted by varying the resistance of the variable resistor 269. The output of the amplifier 276 is fed to the heart beat rate indicator 35. The indicator 35 may be a voltmeter, oscilloscope or other device, and displays linearly the amplified output voltages representing the beat-by-beat heart beat rates of the patient 1. A recorder may be included in the indicator 35 to chronologically record the measurements of the beat-by-beat heart rate.

The output signals represented by the waveforms 0 are also transmitted from the emitter electrode of the transistor 265 to the input terminal 36 of the cardiac arrhythmia indicator 37. Any changes in the level of these output signals is there differentiated by the combination of the capacitor 302 and the resistor 307. The differentiated signal is fed to the amplifier terminal 300. The amplifier 301 acts as a level detector to amplify only those differentiated signals exceeding a certain threshold level. The threshold level is established by the bias voltage applied to the amplifier input terminal 306, and the bias voltage is set so that only substantial cardiac arrhythmia are indicated. For example, the change in the beat-by-beat heart rate between the third and fourth R-wave is shown in the waveform 0 as a sharp increase in voltage level. This sharp increase in level will be differentiated by the capacitor 302 and the resistor 307, and applied to the input terminal 300. Assuming that the amplifier threshold level is exceeded, the differentiated signal will then be amplified by the amplifier 301 to produce a sharp pulse at the output terminal 314. The sharp output pulse, in turn, will trigger the multivibrator 321, and the output pulse of the multivibrator 321 then will cause the transistor 332 to conduct. The conduction of the transistor 332, in turn, will cause the transistor 335 to conduct whereupon the lamp 334 will briefly illuminate to indicate a cardiac arrhythmia. If desired, a speaker or other output device could be connected to the multivibrator terminal 330 to provide an additional indication or record of cardiac arrhythmia.

Thus, an apparatus for monitoring the rate of a recurring event in the preferred form of a cardiotachometer has herein been provided which is capable of monitoring and linearly displaying the beat-by-beat rate of a recurring event, and which is further capable of generating an alarm signal indicative of arrhythmic variations in the rate of occurrence of the recurring event. Additionally, novel integrating means has been provided in the cardiotachometer.

I claim:

1. In apparatus for processing electrocardiographic signals including recurring R-waves which are representative of the heart beats of a patient, the combination of:

terminal means for receiving said electrocardiographic signals;

amplifier means connected to said terminal means for amplifying said electrocardiographic signals;

filter means connected to said amplifier means for transmitting said R-waves while attenuating the remainder of said electrocardiographic signals whereby to transmit only said R-waves;

level-detecting means connected to said filter means, said level detecting means including means responsive to said R-waves for establishing a time varying threshold level proportional to the magnitude of said R-waves, said level-detecting means being so designed that said threshold level is exceeded only by said R-waves, whereby only said R-waves are transmitted therethrough;

multivibrator means connected to said level-detecting means for producing a pair of coincident beat pulses in response to each of said R-waves;

signal-generating means responsive to each pair of said beat pulses for producing a set of control signals in response thereto;

first and second integrating means, each being selectively operable for generating output signals representative of its time interval of operation, said first and second integrating means being responsive to said sets of control signals to be alternately operated during the time intervals between successive ones of said R-waves whereby said first integrating means produces a first series of output signals proportional to the beat-by-beat rate of the even occurring ones of said R-waves, and said second integrating means produces a second series of output signals proportional to the beat-by-beat rate of the odd occurring ones of said R-waves; and means connected to said first and second integrating means for displaying said first and second series of said output pulses.

2. The invention recited in claim 1 wherein said level detecting means is for transmitting only those electrical signals of positive and negative polarities having magnitudes exceeding said threshold level, and wherein said threshold is a time-decaying threshold level proportional to the magnitudes of said R-waves.

3. In integrator means having an input terminal and an output terminal, the combination of:
amplifier means having an input terminal and an output terminal, said amplifier output terminal being connected to said integrator output terminal;
charge storing means being connected between said amplifier input and output terminals;
a field-effect transistor having a source, drain and gate electrodes;
said source electrode being connected to said amplifier input terminal;
said gate electrode being connected to said amplifier output terminal; and
said drain electrode being connected to said integrator input terminal whereby an output signal inversely proportional to the time of integration is generated on said integrator output terminal whenever a constant voltage signal is applied to said integrator input terminal to drive said integrator means.

4. The invention recited in claim 3 including means for selectively discharging said charge storing means.

5. The invention recited in claim 4 wherein said means for selectively discharging said charge storing means comprises:
a field-effect transistor having a drain-to-source current path connected in shunt with said charge storing means; and
means connected to said gate electrode for selectively switching the impedance of said drain-to-source current path between a first and second state, said drain-to-source impedance being substantially infinite in said first state whereby said charge storing means holds its charge, and said drain-to-source impedance being finite in said second state whereby said charge storing means discharges through said drain-to-source current path.

6. In apparatus for processing event signals wherein each event signal is representative of a recurring event, the combination of:
terminal means for receiving said event signals;
means connected to said terminal means for producing a set of control signals in response to each of said event signals;
first and second integrating means each being selectively operable for generating output signals representative of its time interval of operation, said first and second integrating means being responsive to said sets of control signals to be alternately operated during the time intervals between successive ones of said event signals, whereby said first integrating means produces a first series of output signals proportional to the beat-by-beat rate of the even occurring ones of said event signals, and said second integrating means produces a second series of output signals proportional to the beat-by-beat rate of the odd occurring ones of said event signals; and
means connected to said first and second integrating means for displaying said first and second series of output signals, each of said first and second integrating means further including:
amplifier means having an input terminal and an output terminal;
charge storing means being connected between said amplifier input and output terminals;
a field effect transistor having a source electrode, a drain electrode, and a gate electrode, said source electrode being connected to said amplifier input terminal, and said gate electrode being connected to said amplifier output terminal;
voltage-generating means connected to said drain electrode for selectively generating a constant voltage to drive said integrating means;
discharging means being responsive to said sets of control signals for selectively discharging said charge storing means in time phase with alternate ones of said event signals,
said voltage generating means being responsive to said sets of control signals for driving said integrating means during the alternate time intervals between successive ones of said event signals which immediately follow the discharge of said charge storing means whereby said integrating means produces a series of output signals on said amplifier output terminal linearly proportional to the beat-by-beat rate of alternate occurring ones of said event signals.

7. The invention recited in claim 6 in which said event signals processed are electrocardiographic signals including recurring R-waves which are representative of the heart beats of a patient, including:
amplifier means connected to said terminal means for amplifying said electrocardiographic signals; and
filter means connected between said amplifier means and said means for producing said sets of control signals for transmitting said R-waves while attenuating the remainder of said electrocardiographic signals whereby to transmit only said R-waves to said means for producing said sets of control signals.